Oct. 29, 1957     J. M. McGOLDRICK     2,811,099
ROTISSERIE
Filed May 15, 1956
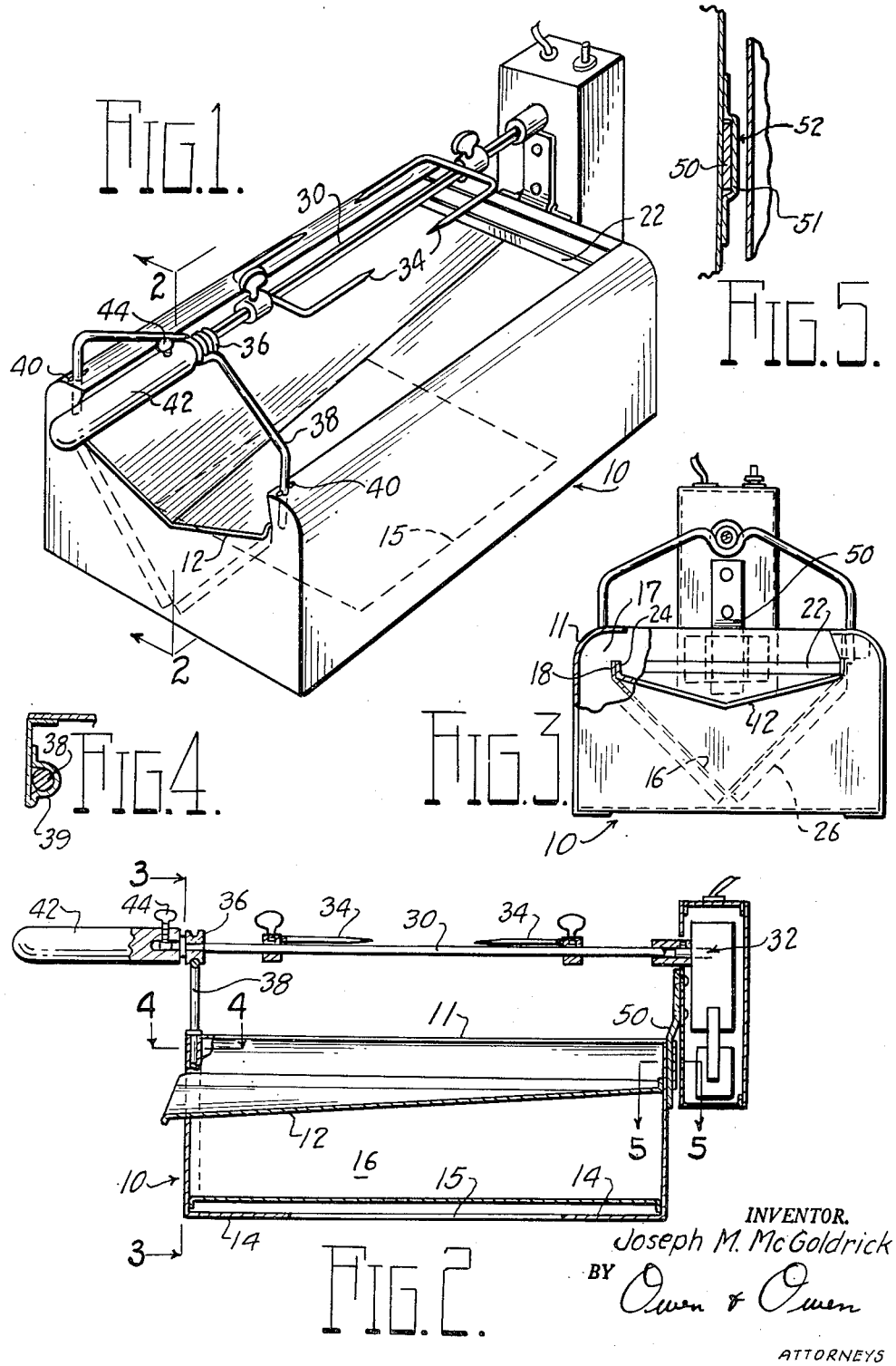
INVENTOR.
Joseph M. McGoldrick
BY Owen & Owen
ATTORNEYS United States Patent Office 2,811,099
Patented Oct. 29, 1957

2,811,099
ROTISSERIE

Joseph M. McGoldrick, Toledo, Ohio, assignor to The Columbia Burner Company, Toledo, Ohio, a corporation of Ohio Application May 15, 1956, Serial No. 584,940

1 Claim. (Cl. 99—444)

This invention relates to a rotisserie and has for its primary object to provide a device that is usable in conjunction with an existing surface burner of a gas or electric range.

Another object of the invention is to provide a rotisserie that can be quickly and easily disassembled and the parts stored in a cavity formed by the body of the unit.

Another object of the invention is to provide a rotisserie in which the parts may be readily disassembled for easy cleaning and in which the operating temperature of the parts is such that fats and similar greases do not burn to cause stubborn discolorations.

Still another object of the invention is to provide a rotisserie that is so constructed that drippings from meat being roasted fall on a surface that is at a temperature below the boiling point of fats so that smokeless operation results.

Other objects and advantages of the invention will become apparent from the following description of a preferred embodiment thereof, reference being had to the accompanying drawings, in which—

Fig. 1 is a perspective view of an assembled rotisserie embodying the present invention;

Fig. 2 is a central vertical section on line 2—2 of Fig. 1;

Fig. 3 is an end view, with parts in section and parts broken away;

Fig. 4 is a detail sectional view taken on line 4—4 of Fig. 2; and

Fig. 5 is a detail sectional view taken on line 5—5 of Fig. 2.

Referring to the drawings, a rotisserie constructed in accordance with the present invention includes a rectangular shell member 10 having side walls that curve upwardly and inwardly as best shown at 11 in Fig. 3. A front wall of the shell closes off one end of the spaces formed by the curving portions 11 and is formed with a V-shaped notch in its upper wall to receive and to register with the lower surface of a drip pan 12. The rear wall of the shell is substantially rectangular although its upper corners are formed to close off the other end of the spaces formed by the curving portions 11 of the side walls.

The bottom of the shell 10 is provided with inwardly projecting base parts 14 which cooperate to form an opening 15 of a size that will conveniently fit over a surface burner of a gas or electric range. A square opening nine inches on a side has been found satisfactory, although the opening may, in specific instances, be larger or smaller to cooperate with ranges of a particular make or design.

Within the shell 10 and fixed as by welding to the front and rear walls thereof is a deflection plate 16 best shown in Fig. 3. The deflection plate is preferably V-shaped with the apex of the V coextensive with the longitudinal center line of the rotisserie and spaced upwardly from the plane of the base only a relatively short distance, approximately one inch. While the V-shaped deflection plate is satisfactory, it has been found in practice that other cross-sectional shapes of the deflection plate may be used with equally good results, and in some instances a deflection plate in which the cross-sectional area varies from end-to-end gives better distribution of the heat at the cooking surface. The upper edges of the deflection plate 16 terminate vertically beneath and slightly outwardly of the inner edges of the curved side wall portions 11 of the shell. Thus an opening 17 (Fig. 3) is formed which extends the full length of the rotisserie between the front and rear walls and is defined at its upper edge by the curving side walls 11 and at its lower edge by the upper edge of the deflector plate. Similar openings 17 are formed at each side of the rotisserie, of course, and currents of hot air are directed inwardly towards the center from each of them during operation as hereinafter described.

The upper edge portion of each side of the deflection plate 16 is made as a small vertical flange 18. The drip pan 12 is slightly dished from side to side and slopes from the rear to the front of the rotisserie. At the front the drip pan extends slightly beyond the shell 10 (Fig. 2). The lower surface of the pan fits closely in the notch of the front wall of the rotisserie to prevent the ingress of air beneath it, and at the rear the pan has an upturned flange 22 which fits closely against the rear wall of the shell similarly to cut off the free flow of air into the space formed between the pan and the deflection plate 16. At its sides, the pan 12 is provided with small upturned flanges 24 which cooperate with the flanges 18 of the upper edge of the deflection plate 16 to guide the pan into place, and subsequently to support it. While the contact between the vertical flanges 18 and 24 must of necessity be shown as substantially perfect and continuous in the drawings, there actually exists only a few points of really intimate contact through which heat can be conducted from the deflection plate into the pan. For the most part, the flanges are separated by a few thousandths of an inch of air which serves as a barrier to conducted heat. Measurements show that the pan operates several hundred degrees cooler than the deflection plate. Since the space between the deflector plate and pan is thus sealed off to any substantial air flow, the air within the space serves to insulate the pan from convected heat, and the pan is heated only by radiation. By polishing the undersurface of the pan, the effect of radiated heat can be greatly reduced. It is found that the absorption of radiated heat is so low that while the pan operates above the boiling point of water its surface temperature never exceeds the boiling point of fats that drip from the meat being roasted so that the operation of the rotisserie is essentially smokeless.

Every effort is made to prevent the ingress and egress of air from the space between the drip pan 12 and the deflection plate for the reason that any substantial flow of cold air into and out of this space seriously interferes with the progress of the cooking as hereinafter described and definitely upsets the path of the hot gases flowing upwardly around the deflection plate.

Heat directing fins 26 can be attached to and extend from the undersurface of the deflection plate 16, the fins extending upwardly and outwardly from the center of the opening 15. Thus heated air from above the surface burner of the range is distributed substantially equally throughout the entire longitudinal area of the deflection plate and flows equally from the openings 17 from end to end. As above noted, the deflection plate may be changed in its cross-section from end to end to aid in the distribution of the heat flowing upwardly from the burner around it. It has been found in practice that a variation of from 50 to 100° can be tolerated in the temperature of the air issuing from the openings 17 without seriously interfering with the progress of cooking.

Any suitable device may be used to support meat or other foods in the rotisserie, it being desirable, however, that it be easily disassembled. Thus, a spit 30 may be used, one end of which has a detachable driving connection with a suitable geared down motor drive 32. The spit carries conventional facing skewers 34 which are fixed in adjusted position on the spit by appropriate thumb screws. A flanged roller 36 supports the spit over a detachable frame 38.

As shown in Fig. 4 the frame 38 includes a wire body having depending legs which are inserted into sockets 39 formed by, or attached to the end wall of the shell 10 of the rotisserie. Small pins 40 extending through the depending legs of the frame 38 determine the extent to which these depending legs may enter the supporting sockets 39. The wire frame is easily removable by lifting it upwardly when it is desired to disassemble the rotisserie.

An appropriate handle of wood or similar material designated 42 may be attached to the spit by a thumb screw 44.

The driving motor 32 for the spit is, as shown in Figs. 1, 3 and 5, detachably mounted on the housing 10 by a tongue 50 which is welded, riveted, or otherwise fixed to the front of the motor housing and which is received in an appropriate socket formed or attached to the rear wall of the shell member 10. The socket may be formed by welding a formed strip of metal 51 to the housing to provide a rectangular opening of a size closely corresponding to the size of the tongue 50 so that the parts engage frictionally. The extent to which the tongue is received in its socket member is determined by an offset in the tongue. Since the shell member operates at a relatively high temperature the amount of heat that is conducted into the motor housing is determined by the volume of the tongue 50 and by the intimacy of its connection with the socket 52. The motor is mounted in its housing by suitable screws or the like and is held away from the walls thereof so that a current of air can pass upwardly through the housing and around the motor. It has been found that the motor temperature will not exceed 170–190° F. even though the housing temperature is in the range of 250° F.

When it is desired to store the rotisserie, it is only necessary for the user to lift off the spit, remove the handle and skewers therefrom, and to lift off the support wire 38 and the driving motor 32. The only screw connections to be taken apart are the thumb screws for the handle and skewers. The user than slides the drip pan 12 outwardly to expose the space beneath it. The motor housing, skewers, support bracket, spit and handle may all be put into this space and covered by the drip pan which is slid back in an inverted position. Thus the entire rotisserie may be stored in a cupboard or the like in a space no larger than that required to hold the housing 10 alone.

In operation, meat or other food to be roasted is mounted on the spit 30 and held against rotation relative thereto by the skewers 34. The spit is brought into driving engagement with motor 32 and the unit placed over a gas flame or an electric heating element in registry with the bottom opening 15. The heat from the source passes upwardly on each side of the deflection plate 16 and is spread lengthwise of the plate by the diverters 26 or by any other suitable means. As it reaches the openings 17 the heated air is turned laterally inward by the curved walls 11 and strike against the meat to be roasted. It has been found in practice that an air temperature of about 600° F. exists just below the free edge of the walls 11, and that a temperature drop of only about 50° F. takes place from this point into the spit, so that for all purposes the 600° F. temperature can be counted on at the surface of the meat. Thus adequate heating takes place to roast meat at rate comparable to oven roasting. However, the 600° temperature at the surface of the meat persists only momentarily as the spit is turned and the heated surface is brought into the colder zone at the top. Thus the surface being subjected alternately to high and low temperature has the effect of sealing in the juices and liquids and meat is cooked almost without shrinkage.

The inward, lateral flow of air can be measured and plotted by taking the temperature of the stream at various points. It has been definitely established that the lateral flow persists to such an extent that the air rises only slowly whereas it would be normally expected to rise quite rapidly after issuing from the openings 17.

Drippings from the meat or foods being roasted fall to the drip pan 12. These drippings comprise fats and aqueous solutions of solid material which will smoke, char and crust if the temperature of the pan is too high. With the present invention the quantity of drippings is very low, however. The pan temperature, by reason of the insulating effect of the air volume beneath it remains less than 350° F., even though the surface temperature of the deflection plate 16 reaches 800° F. At this low temperature no smoking occurs and whatever drippings occur simply run down the pan 12 into a suitable receptacle.

Obviously the meat is wholly exposed for basting at all times, and a thermometer may conveniently be inserted into it parallel to the spit so that an indication of the extent to which cooking has proceeded is continuously available as the meat or food is rotated slowly.

After the inserted thermometer indicates that the meat has reached the proper or desired stage of cooking it is found that it can be maintained without further cooking, if desired, merely by turning down the heat beneath the deflection plate. A roast can be held in a "rare" state for as long as 45 minutes without cooling merely by reducing the flame or burner temperature.

While the invention has been disclosed in conjunction with a specific form and disposition of the parts, it should be expressly understood that numerous modifications and changes may be made therein without departing from the scope of the appended claim.

What I claim is:

A rotisserie for use over a range surface burner comprising a shell having a heat receiving opening in its bottom wall, a deflection plate carried by the end walls of said shell overlying said opening, said deflection plate being V-shaped in cross-section with the angle of the V being approximately 90°, the free edges of said plate terminating inwardly of and below the side walls of said shell to form longitudinal heat discharging openings at each side of said shell, the upper portions of the side walls of said shell being extended over the upper edges of said deflection plate to direct heated air from said longitudinal heat discharging openings towards the center plane of said shell, a drip pan carried by said deflection plate and cooperating with the end walls of said shell to form a substantially closed insulating air space between said drip pan and said deflection plate, said drip pan being disposed below said heat discharging openings, and means carried by said shell to support a food carrying spit over said drip pan.

References Cited in the file of this patent

UNITED STATES PATENTS

| | | |
|---|---|---|
| 693,725 | Leland | Feb. 18, 1902 |
| 739,214 | Phillips | Sept. 15, 1903 |
| 848,018 | Englehard | Mar. 26, 1907 |
| 904,382 | Van Patten | Nov. 17, 1908 |
| 1,051,503 | Klein | Jan. 28, 1913 |
| 2,604,033 | Chadwick et al. | July 22, 1952 |
| 2,715,870 | Rutkowski | Aug. 23, 1955 |